Patented Feb. 3, 1931

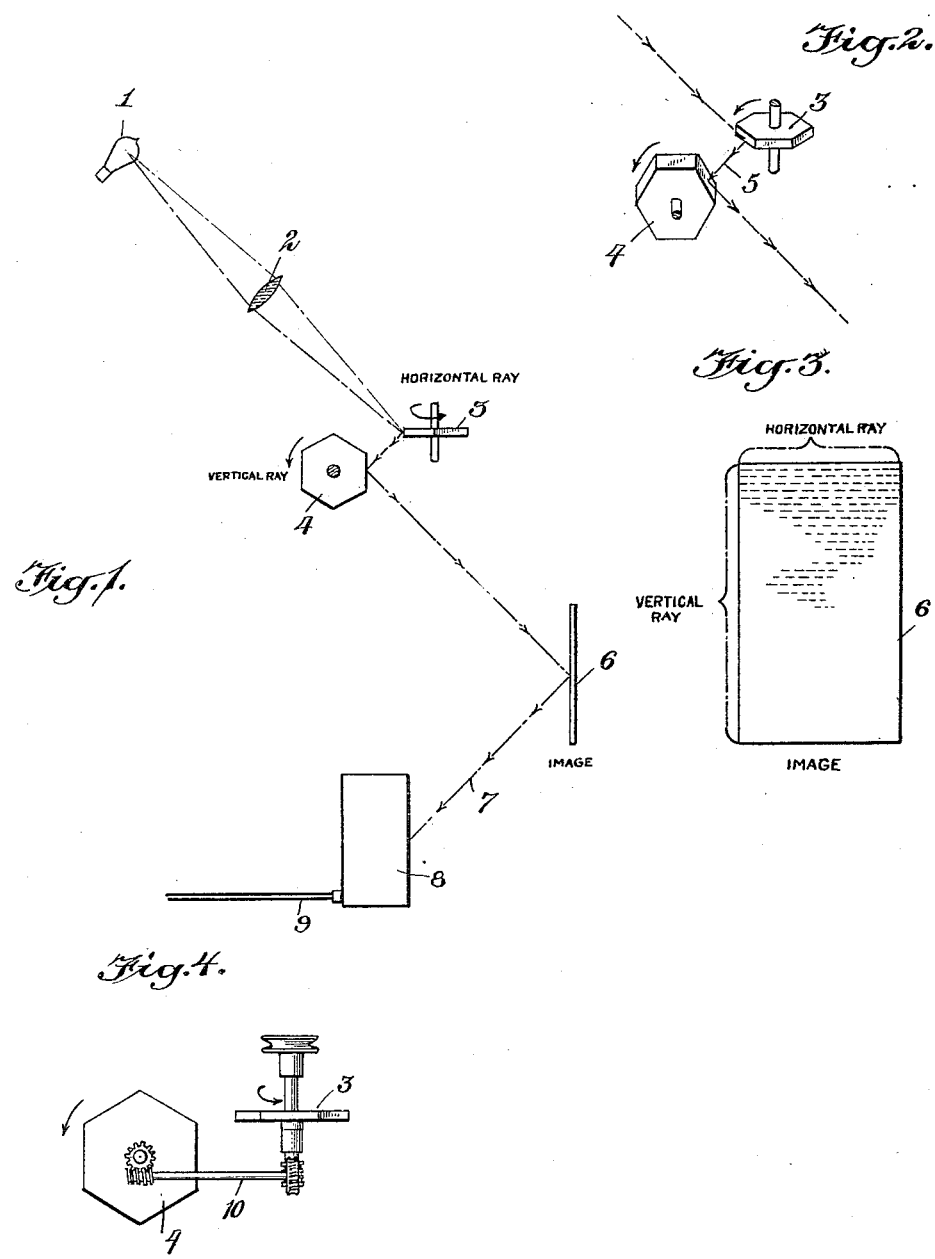

1,791,481

UNITED STATES PATENT OFFICE

OSCAR TERVO, OF NORWAY, MAINE; ANNA MARY TERVO ADMINISTRATRIX OF SAID OSCAR TERVO, DECEASED

TELEVISION SCANNING DEVICE

Application filed December 10, 1928. Serial No. 324,899.

This invention relates to a television apparatus, and particularly to an improved scanning device, the object being to provide a simple and very effective device wherein scanning may be done at substantially any desired speed.

Another object of the invention is to provide in a television apparatus, a scanning construction which eliminates the usual scanning disk.

An additional object of the invention, more specifically, is to provide an improved scanning device for a television apparatus, wherein rotating reflecting surfaces are provided and arranged to cause a pencil of light to travel over the image or article to be transmitted.

In the accompanying drawings,—

Figure 1 is a diagram showing the parts of a transmitting device in a television apparatus, the same including a scanning device embodying the invention;

Figure 2 is an enlarged perspective view of the scanning device shown in Figure 1;

Figure 3 is an enlarged elevation of the image or object to be transmitted with lines thereon indicating the travel of the beam of light over the image;

Figure 4 is a top plan view of the scanning structure shown in Figure 1, together with certain of the driving mechanism, whereby the two mirror polyhedrons are rotated in certain time relationship.

Referring to the accompanying drawings by numerals, 1 indicates a suitable source of light of any desired kind and 2 a lens for focusing the light to a small point on the mirror structure 3 which is shown as a six-faced mirror, though some other number of faces may be used without departing from the spirit of the invention. This mirror is designed to operate in a horizontal plane and is preferably one-fourth of an inch in thickness and two inches in diameter. Co-acting with the rotating mirror 3 is a mirror 4 rotating in a vertical plane, and as an example, this mirror may be two inches in diameter with six faces, each face being one-half inch wide. When the mirrors are rotating the point of light striking one of the faces of mirror 3 will produce a pencil of light 5 adapted to strike one of the faces of the mirror 4 and the mirror will deflect the pencil of light so that it will strike the image 6 which is to be transmitted. A pencil of light 7 will be reflected from the image 6 to the photo-electric cell 8 and the electrical current generated therein will pass over the wires 9 to the receiving station. This current is of course amplified and at the receiving station is again translated back into light and projected against a fluorescent surface or some other receiving surface. Heretofore in scanning an image, as for instance, image 6, a scanning disk was used, said disk having suitable openings to cause the beam or pencil of light to travel horizontally over the image and at the same time to cause the beam to move vertically so that any number of lines may be provided on the given image, as for example, sixty horizontal lines, and these sixty lines may be projected on the image at the rate of sixteen per second, so that there will be sixteen pictures or images per second projected onto the photo-electric cell 8 in order that a good reproduction may be secured at the receiving end. In the present invention the same idea of scanning an image is used, but instead of using the disk with the holes as heretofore done, the mirrors 3 and 4 are used, together with the lens 2, so that a beam of light is caused to travel over the image at a desired speed horizontally and vertically. In case sixty lines are desired per given image the mirror 3 is rotated at a speed to produce these lines, while the mirror 4 is rotated at a less speed to cause a repeat of sixty lines sixteen times per second where sixteen images are desired per second.

As shown in Figure 4, a suitable driving mechanism 10 is provided so that the two mirrors will be driven at the proper proportion of speed. It is, of course, evident that other forms of driving means besides that illustrated may be used, but there must always be a certain relationship in speed between the mirrors 3 and 4. Each of the faces of the mirror 3 produces a line so that upon one rotation of the mirror 3 six lines will be produced where the mirror 3 has six faces.

Therefore, in order to produce sixty lines while mirror 4 is making one-sixth of a revolution mirror 3 must rotate ten times, and thereby present sixty faces to one face of the mirror 4. If mirror 4 is rotating at a speed which will present sixteen faces per second to the image 6 there will be sixteen images produced per second and the reflected pencil of light 7 will be properly applied and distributed to the photo-electric cell 8 which acts in the usual manner for producing electricad impulses. It will thus be seen that by the use of the two mirrors operating in planes at right angles to each other a proper scanning of an image may be secured and all of the rays of light in the pencil of light utilized so that a stronger current will be produced in the photo-electric cell, and consequently, a better image transmitted. Heretofore only a small portion of light was projected onto the image by reason of the fact that the scanning plate held back all the light except the part extending through the aperture therein. In the present instance, whatever light is provided is utilized to the fullest extent and therefore a maximum result or action can be secured. The invention has been described in respect to a transmitting or sending apparatus, but it will be evident that the invention could be used in connection with a receiving apparatus without departing from the spirit of the invention.

What I claim is:—

1. In a television apparatus, means acting as a scanning device, said means consisting of a pair of mirrors rotating in right angle planes, one mirror being not more than one-fourth of an inch in width, and a lens acting to focus a point of light on said mirror.

2. In a scanning device for a television apparatus, a horizontally rotatable mirror formed with a plurality of flat faces at angles to each other, each of said faces being not more than one-fourth of an inch in width, a lens positioned to focus a point of light on said horizontally rotatable mirror, and a second mirror operating in a vertical plane having a plurality of flat faces not more than a half inch in width but substantially wider than the width of the first-mentioned mirror, said mirrors being operated at different speeds and positioned so that a pencil of light striking the first-mentioned mirror will be deflected to the second-mentioned mirror and thence to the image to be transmitted.

OSCAR TERVO.